United States Patent
Schneider

(10) Patent No.: US 8,863,151 B2
(45) Date of Patent: Oct. 14, 2014

(54) SECURING INTER-PROCESS COMMUNICATION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1082 days.

(21) Appl. No.: 11/893,444

(22) Filed: Aug. 15, 2007

(65) Prior Publication Data

US 2009/0049454 A1   Feb. 19, 2009

(51) Int. Cl.
G06F 3/00 (2006.01)
G06F 15/16 (2006.01)
G06F 9/54 (2006.01)

(52) U.S. Cl.
CPC ..................... *G06F 9/546* (2013.01)
USPC ............. 719/314; 719/313; 709/250

(58) Field of Classification Search
CPC ... G06F 9/546; G06F 15/76; G06F 2209/486; G06F 2209/548; G06F 9/45533; G06F 3/0635; H04L 12/5815; H04M 3/53333; H04M 3/53366
See application file for complete search history.

(56) References Cited

U.S. PATENT DOCUMENTS

| | | | | |
|---|---|---|---|---|
| 4,694,396 | A * | 9/1987 | Weisshaar et al. | 719/314 |
| 4,754,395 | A * | 6/1988 | Weisshaar et al. | 719/313 |
| 5,611,043 | A * | 3/1997 | Even et al. | 714/38 |
| 6,795,920 | B1 * | 9/2004 | Bacha et al. | 713/168 |
| 7,463,935 | B1 * | 12/2008 | Miller et al. | 700/1 |
| 7,774,846 | B2 * | 8/2010 | Rothman et al. | 726/24 |
| 7,921,227 | B2 * | 4/2011 | Ban | 709/250 |
| 2004/0205770 | A1* | 10/2004 | Zhang et al. | 719/314 |
| 2005/0005306 | A1* | 1/2005 | Kim et al. | 725/131 |
| 2005/0055701 | A1* | 3/2005 | Stall | 719/314 |
| 2005/0114895 | A1* | 5/2005 | Ismail et al. | 725/81 |
| 2005/0262159 | A1* | 11/2005 | Everhart et al. | 707/201 |
| 2006/0129650 | A1* | 6/2006 | Ho et al. | 709/207 |
| 2006/0248600 | A1* | 11/2006 | O'Neill | 726/29 |
| 2007/0014295 | A1* | 1/2007 | Fernandes et al. | 370/395.2 |
| 2007/0060366 | A1* | 3/2007 | Morrow et al. | 463/42 |
| 2008/0098475 | A1* | 4/2008 | Girouard et al. | 726/21 |
| 2009/0271863 | A1* | 10/2009 | Govindavajhala et al. | 726/23 |

* cited by examiner

*Primary Examiner* — Tuan Dao
(74) *Attorney, Agent, or Firm* — Lowenstein Sandler LLP

(57) ABSTRACT

A request to post a message to a destination is intercepted in an operating environment in which processes communicate via message queues. Message content and requester information associated with the request is evaluated to determine whether the message is to be posted. The message is posted to a message queue of the destination if the message is to be posted.

18 Claims, 5 Drawing Sheets

SECURING INTER-PROCESS COMMUNICATION

TECHNICAL FIELD

Embodiments of the present invention relate to inter-process communication, and more specifically to securing inter-process communication in operating environments in which processes communicate using message queues.

BACKGROUND

In certain operating environments, processes communicate with one another using message queues (e.g., to pass event information). Almost all communication that occurs in such operating environments is processed through one or more message queues. One operating environment in which processes communicate using message queues is the Microsoft Windows® operating system. Wine (Wine is not an emulator), and ReactOS® are additional examples of operating environments in which message queues are used to pass messages.

FIG. 1 illustrates a conventional operating environment 100, in which processes communicate using message queues. The conventional operating environment 100 includes a requestor 105, a message poster 110 and a destination 115. The requestor 105 and destination 115 may each be processes running in the conventional operating environment 100.

Requestor 105 may generate a message to be processed by destination 115. The message may include a message number and provided parameters. However, the message does not include context information (e.g., the context in which the message was created), or requestor information about the process that created the message.

The message is sent to a message poster 110. The message poster 110 receives the message, and posts it to a message queue 120 of destination 115. Once other messages preceding the received message in the message queue 120 are processed, the message processor 125 processes the received message.

One problem with the conventional operating environment 100 is that none of the message poster 110, destination 115 or message processor 125 authenticate messages back to their source (requester 105). Therefore, the message processor 125 does not know where the message originated, or how it arrived at the message queue 120.

Destination 115 may check message properties to make sure that they include valid (e.g., possible) values. However, many destinations 115 do not thoroughly check messages. Therefore, it is possible for requestor 105 to run arbitrary code in the context of destination 115 by sending a message to destination 115. Where the destination 115 is a process running with administrative privileges (e.g., process run by LOCAL SERVICE, by SYSTEM, by NETWORK SERVICE, etc.), an ability to run code in the context of destination 115 enables requestor 105 to crash the operating environment, to run arbitrary code with administrative privileges (e.g., read/write privileges), or to perform other harmful activities.

BRIEF DESCRIPTION OF THE DRAWINGS

The present invention is illustrated by way of example, and not by way of limitation, in the figures of the accompanying drawings and in which.

DETAILED DESCRIPTION

Figure 1:
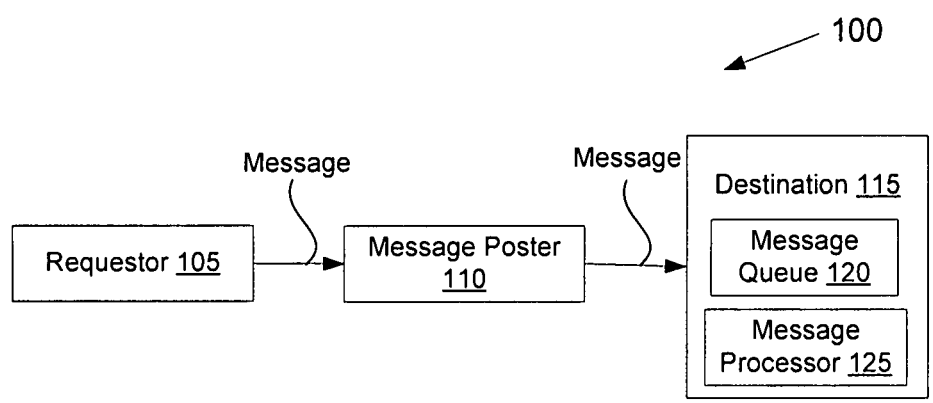
FIG. 1 illustrates a conventional operating environment, in which processes communicate using message queues.

Described herein is a method and apparatus for securing inter-process communications. In one embodiment, a request to post a message to a destination is intercepted. Message content and requestor information associated with the request may be evaluated to determine if one or more posting criteria are satisfied, and whether the message is to be posted to a message queue of the destination. The posting criteria may ensure that nefarious processes or other undesirable processes do not gain access to restricted data or privileges. The requestor and the destination may be processes in an operating environment in which processes communicate via message queues.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "generating", "performing", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 2:
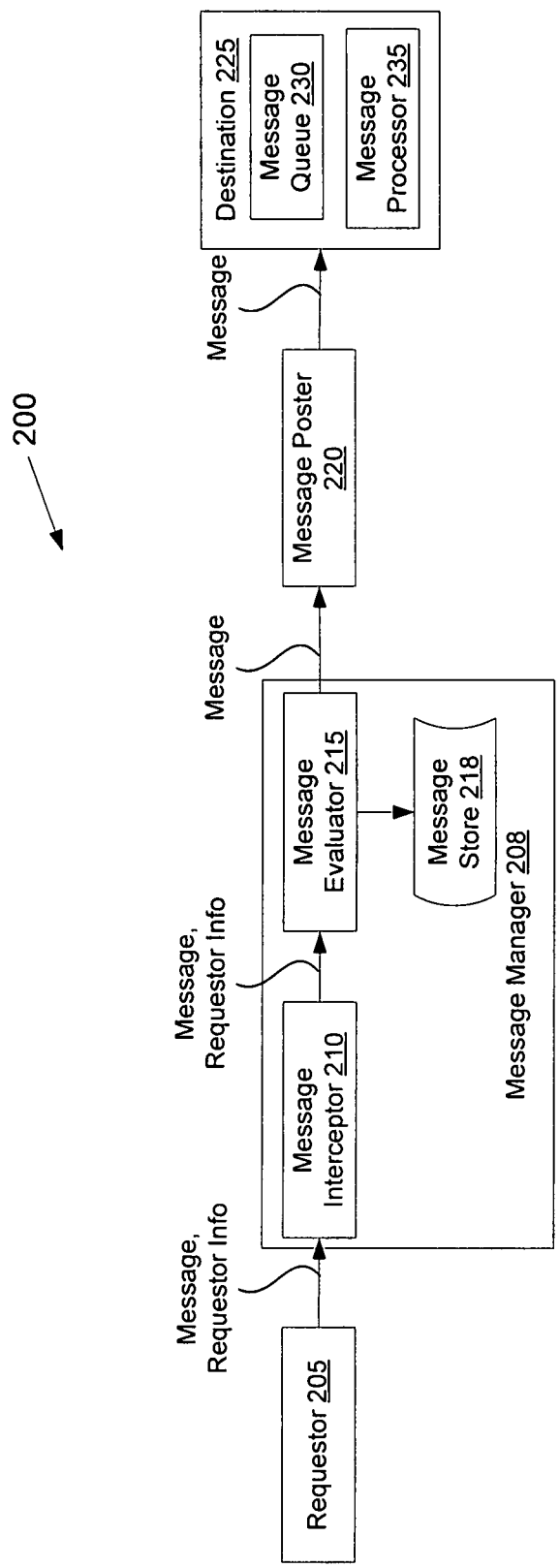
FIG. 2 illustrates an exemplary operating environment, in which embodiments of the present invention may operate.

FIG. 2 illustrates an exemplary operating environment 100 in which embodiments of the present invention may operate. The operating environment 100 may be an operating environment in which processes communicate by exchanging messages. A process may communicate with another process by posting a message to a message queue of the other process. In one embodiment, processes communicate with other processes exclusively via message queues. In a further embodiment, the operating environment is the Microsoft Windows® operating system. Alternatively, the operating environment may be the ReactOS® operating system or the Wine operating environment.

In one embodiment, the operating environment 200 includes a requestor 205, a message manager 208, a message poster 220 and a destination 225. The requestor 205 and the destination 225 may be processes running in the operating environment 200. In one embodiment, the requestor 205 and destination 225 are window objects associated with a process or processes. A window object is a data structure used to manage windows and/or processes. Each process may have multiple window objects, each of which may be represented by a unique window handle. The operating environment 200 may include additional processes, each of which may also be requesters 205 or destinations 225. Therefore, the operating environment 200 may include multiple requestors 205 and multiple destinations 225. Moreover, a single process may be both a requestor 205 and a destination 225. This may occur, for example, when a process posts a message to another process, and receives a message from yet another process. This may also occur if a process posts a message to itself.

In one embodiment, the operating environment 200 runs on an individual computing device. In another embodiment, the operating environment 200 is part of a distributed computing system, in which requester 205 and destination 225 may be processes operating in different computing devices and/or different operating environments 200.

Requestor 205 may generate a message directed to destination 225. The message may be an integer or any arbitrary string, and may include one or more process parameters. In one embodiment, requestor 205 then attempts to invoke (call), and then pass the message to, message poster 220. Requestor 205 may invoke message poster 220 by calling a dynamic link library (dll) or application programming interface (API) for message poster 220. By invoking message poster 220, requestor 205 may also automatically cause message manager 208 to be invoked. In another embodiment, requestor 205 may invoke message manager 208, and then send the message to message manager 208.

Message manager 208 may include a message interceptor 210, a message evaluator 215 and a message store 218. Once message manager 208 is invoked (e.g., when message poster 220 is invoked), message interceptor 210 may intercept and/or receive a message from requestor 205. Message interceptor 210 may also receive requestor information along with the message. In one embodiment, in which message manager 208 is invoked in the context of requestor 205, the requestor information includes one or both of a process identifier (process ID) and a thread identifier (thread ID) of the requestor 205. In another embodiment, in which requestor 205 is from a remote operating device (e.g., a device other than a device on which operating environment 200 is running), requester information includes one or both of a session identifier (session ID) and a user identifier (user ID) of the requestor 205. Message interceptor 210 may then pass on the message and requester information to message evaluator 215.

Message evaluator 215 may analyze the message, the requester information (e.g., thread ID and process ID) and destination information (e.g., a window handle of destination 225, a thread ID and/or process ID associated with the window handle of destination 225, etc.) to determine whether to pass the message on to message poster 220. Message evaluator 215 may be a protected function to minimize security risk. In one embodiment, message evaluator 215 is a kernel level module (or function), which may increase the difficulty of deleting or modifying message evaluator 215. Tampering of message evaluator 215 may thus be reduced or eliminated.

Message evaluator 215 may apply a number of message posting rules (criteria) to determine whether to pass on a message to the message poster 220. Message posting rules may be arranged in a hierarchical fashion, such that a second rule may only apply if a first rule is satisfied. Alternatively, subsequent rules may only apply if a preceding rule fails to be satisfied. Rules in the hierarchy may also include as part of their definition whether or not to execute successive rules. For example, a first rule may specify to execute a second rule if the first rule is satisfied, and a third rule if the first rule is not satisfied.

Optimally, message posting rules should enable message evaluator 215 to determine whether to pass a message to message poster 220 as quickly as possible, and with a minimum amount of overhead (e.g., processor and/or memory usage). Therefore, rules that are quicker to process may be applied before rules that are slower to process. Furthermore, rules that filter out a large percentage of messages may be applied before rules that filter out a small percentage of messages. Thus, for example, a first rule may pass on all messages that are not directed to a destination 225 that has administrative privileges. This rule may be processed without examining process parameters of the message, and without examining requestor information. Since most messages will not be directed to a destination with administrative privileges, this rule will also filter out a majority of messages. This may minimize processor time used to analyze messages, and increase message throughput. Additional message posting rules are described with reference to FIG. 4 below.

Referring to FIG. 2, based on application of the message posting rules, message evaluator 215 may or may not pass on the message to message poster 220. In one embodiment, if message evaluator 215 does not pass the message to the message poster 220, it informs the requestor 205 that the message could not be posted. In another embodiment, if the message is not to be posted (passed on to message poster 220), and additional message posting rules are satisfied, the requestor 205 is terminated. The additional message posting rules may call to terminate the requestor 205 if, for example, the message is an undocumented message, the message includes impermissible or impossible values, or the message is being posted in an inappropriate context. If the additional message posting rules are satisfied, the requestor 205 may be terminated by the message manager 208, or by a terminator (not shown) invoked by the message manager 208.

In one embodiment, message evaluator 215 stores information regarding the message, destination information and/or requestor information in message store 218. In one embodiment, such information is stored for messages that are not passed on to message poster 220 (e.g., messages that fail one or more message posting rules). Message store 218 may be used to track refused messages (those not passed to message poster 220), and monitor message activity of requester 205. In one embodiment, the message store 218 may also include requestor restriction lists. The restriction lists may restrict a particular requester 205 from posting messages to destinations having administrative privileges. Alternatively, the restriction lists may prevent a requester 205 from posting messages to any destination 225.

Once a message is passed to message poster 220, message poster 220 posts the message to a message queue 225 of destination 225. A message processor 235 of the destination then processes the message. Before the message is processed, destination 225 may examine the provided message parameters to ensure that the message has valid values. In one embodiment, a message processor 235 of the destination is a winproc (window procedure) of a Microsoft® Windows operating system process.

Figure 3:
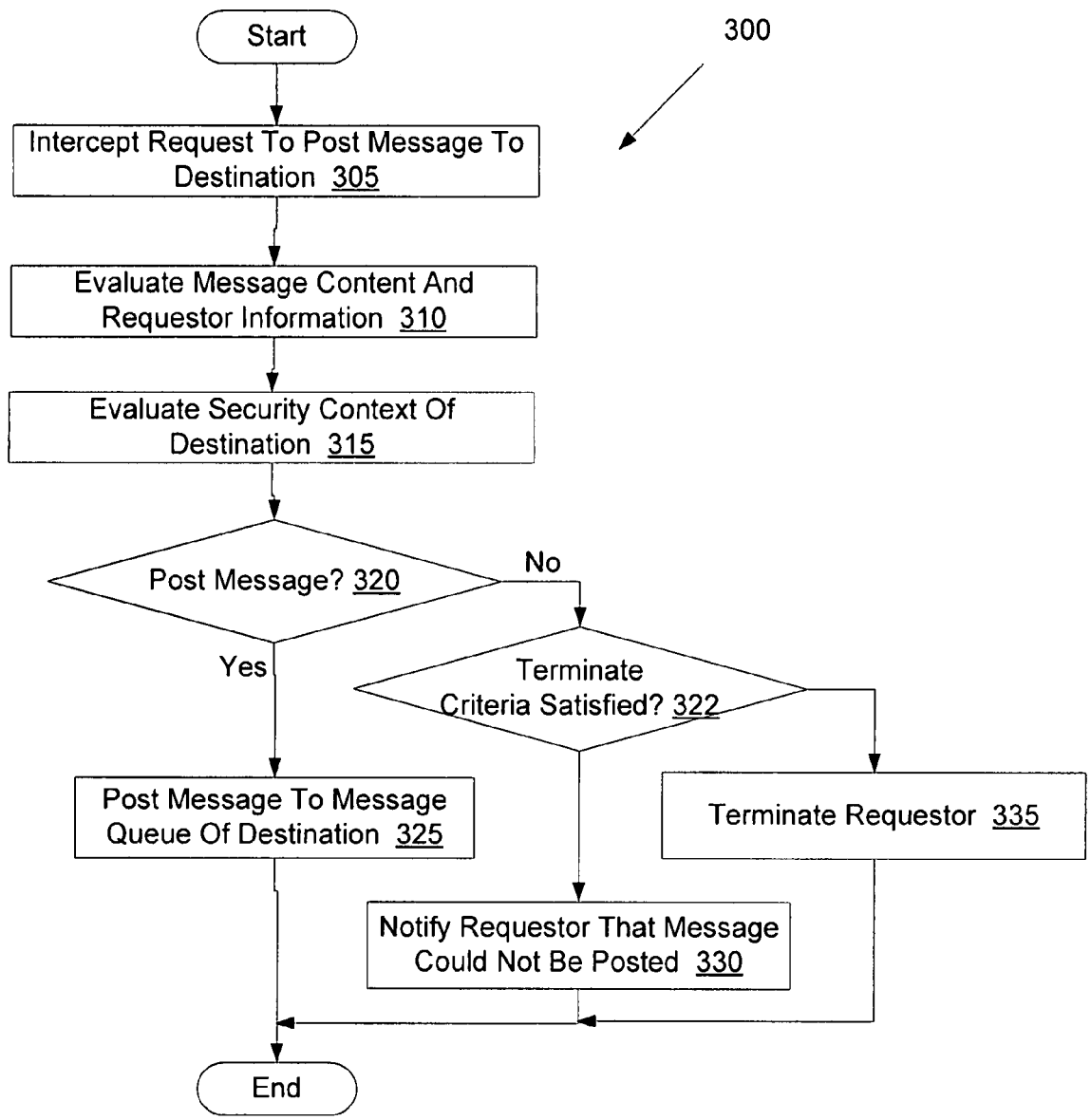
FIG. 3 illustrates a flow diagram of one embodiment for a method of securing inter-process communication.

FIG. 3 illustrates a flow diagram of one embodiment for a method 300 of securing inter-process communication. The method may be performed by processing logic that may comprise hardware (e.g., circuitry, dedicated logic, programmable logic, microcode, etc.), software (such as instructions run on a processing device), or a combination thereof. In one embodiment, method 300 is performed by message manager 208 of FIG. 2.

Referring to FIG. 3, method 300 includes intercepting a request to post a message to a message queue of a destination process (block 305). The request may be intercepted from a requestor process, and in one embodiment is intercepted from a method invoked on a window object associated with a requestor process. The message may have been generated by an event of the requester process, or by other events in an operating system (e.g., an event caused by a key press of a keyboard or a click of a mouse). In one embodiment, requestor information is received along with the message.

At block 310, message content and requestor information are evaluated. Evaluating the message content and requestor information may include applying one or more message posting rules (criteria) to the message content and requestor information. At block 315, a security context (e.g., whether destination has administrative privileges) of the destination is evaluated. Evaluating the security context of the destination may include applying one or more additional message posting rules. In one embodiment, the message content, requestor information, and security context of the destination are evaluated concurrently. Therefore, in some embodiments, block 310 and block 315 can be combined or performed in parallel.

At block 320, processing logic determines whether to allow the message to be posted. This determination is made based on the application of the message posting rules to the message content, requestor information, and/or security context of the destination, as described in blocks 310 and 315. In one embodiment, if all message posting rules are satisfied, the message will be posted. In another embodiment, if some of the message posting rules are satisfied, the message will be posted. If the message is to be posted, the method proceeds to block 325 and the message is posted to a message queue of the destination. If the message is not to be posted, the message proceeds to block 322.

At block 322, processing logic determines whether termination criteria have been satisfied. Examples of termination criteria include an attempt to post an undocumented message, an attempt to post a message with impermissible (invalid or impossible) parameters, or an attempt to post a message in an inappropriate context. If some or all termination criteria are satisfied, the method proceeds to block 335, and the message requestor is terminated. If no termination criteria are satisfied (or not enough termination criteria are satisfied), the method proceeds to block 330, and the requester is notified that the message could not be posted. Alternatively, if the message is not to be posted, the method may end without sending any notification to the requestor.

Figure 4:
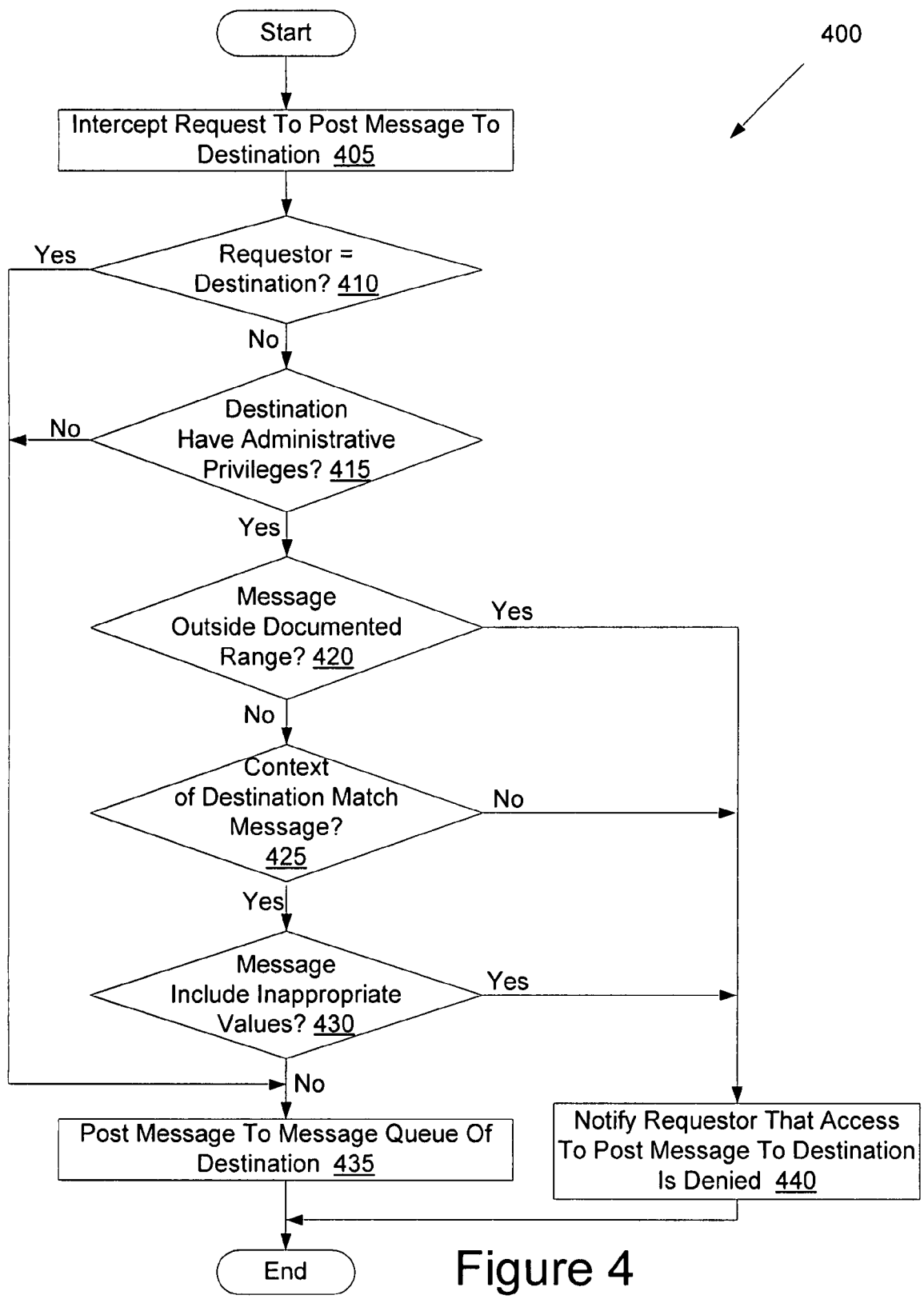
FIG. 4 illustrates a flow diagram of another embodiment for a method of securing inter-process communication.

FIG. 4 illustrates a flow diagram of another embodiment for a method 400 of securing inter-process communication. The method may be performed by processing logic that may comprise hardware (e.g., circuitry, dedicated logic, programmable logic, microcode, etc.), software (such as instructions run on a processing device), or a combination thereof. In one embodiment, method 400 is performed by message manager 208 of FIG. 2.

Referring to FIG. 4, method 400 includes intercepting a request to post a message to a message queue of a destination process (block 405). At block 410, the message is checked to determine whether the requestor is the same as the destination. This may occur when a process posts messages to itself, and may be determined without examining message contents (e.g., process parameters). If the message is being sent to the same process that generated it, the method proceeds to block 435. This allows all processes to post messages to themselves regardless of the message content. If the message is not being sent to the same process that generated it, the method proceeds to block 415.

At block 415, processing logic determines whether the destination has administrative privileges (e.g., ability to read/write data, to start, stop or suspend a process as any user, etc). Messages generally direct the execution of code in a context of the destination. Therefore, a message may direct a destination having administrative privileges to execute code with administrative privileges, though the code would not otherwise be executed with administrative privileges. In contrast, messages sent to destinations that do not have administrative privileges cannot be granted administrative privileges. Therefore, the message will not be able to damage critical system components, crash system or subvert security of an operating environment in which the destination is running if the message is not directed to a destination with administrative privileges. If the destination does not have administrative privileges, the method proceeds to block 435. If the destination does have administrative privileges, the method proceeds to block 420.

At block 420, processing logic determines whether the message is outside of a documented range. A list of expected values may be maintained. Messages that do not include a value that is in the list may be assumed to be undesirable or suspicious. Accordingly, if the message does not include values within the documented range, the method continues to block 440. If the message does include values within the documented range, the method proceeds to block 425.

At block 425, processing logic determines whether a context of the destination matches the message. For example, if the message is a paint message (e.g., to display a fish), and the destination does not have any visible windows, then the context of the destination may not match the message. If the context of the destination does not match the message, the method proceeds to block 440. If the context of the destination does match the message, the method proceeds to block 430. Alternatively, if it cannot be determined whether the context of the destination matches the message, the method may proceed to block 430.

At block 430, processing logic determines whether the message includes inappropriate (invalid or impossible) values. Inappropriate values are values that may not be properly executed by the destination, examples of which include invalid pointers, pointers to areas of memory that the requester doesn't have permission to access, incorrect buffer lengths or offsets, etc. Such inappropriate values may cause the destination to crash, or cause other harmful effects. If the message includes inappropriate values, the method proceeds to block 440. If the message does not include inappropriate values, the method proceeds to block 435.

At block 435, the message is posted to a message queue of the destination. In one embodiment, the message is passed to a message poster that posts the message to the message queue of the destination. At block 440, the requestor is notified that the message could not be posted. Alternatively, the message may simply not be posted without notifying the requestor. The method then ends.

Method 400 has been described with a specific hierarchy of message posting rules. However, other arrangements of message posting rules may also be used. For example, block 415 and block 410 may apply in reverse order to what is shown. Alternatively, one or more of the rules illustrated in blocks 410, 415, 420, 425 and 430 may not be used. Additional rules not illustrated herein may also be applied. For example, a rule may be applied that will not allow requestors that do not typically interact with a network to post network-related messages.

Figure 5:
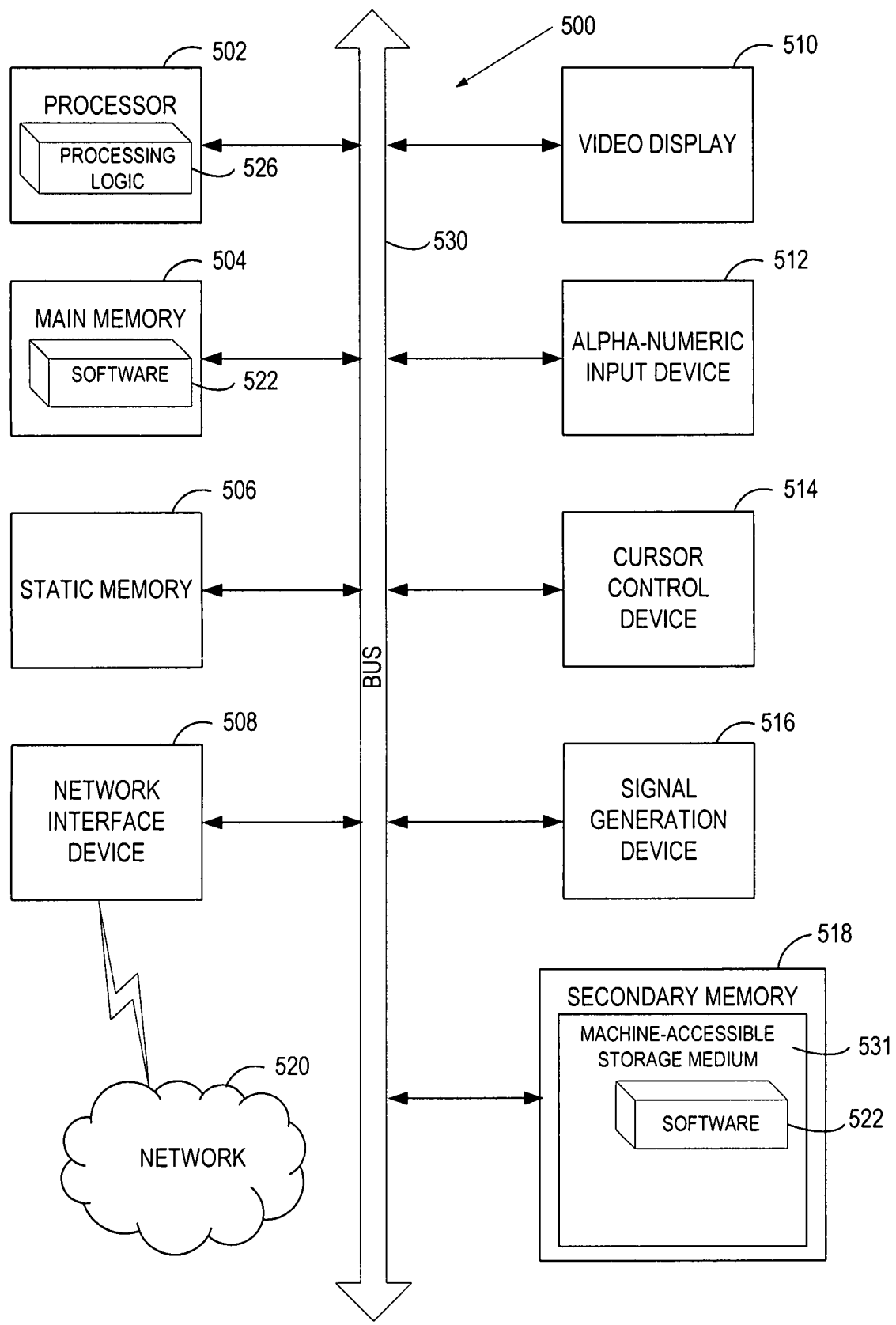
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
intercepting, by a processing device, a request from a requesting process to post a message to a destination process in an operating environment in which processes communicate via message queues, wherein each destination process in the operating environment communicates via a corresponding message queue;
determining whether the requesting process is a same as the destination process in view of the message;
in response to a determination that the requesting process is not the same as the destination process,
evaluating message content and requestor information associated with the request to determine whether the message is to be posted;
posting the message to a message queue of the destination process if the message is to be posted; and
if the message is not to be posted, and the message satisfies additional criteria, causing the requesting process to be terminated, wherein the additional criteria comprise posting an undocumented message; and
in response to a determination that the requesting process is the same as the destination process, posting the message to the message queue of the destination process.

2. The method of claim 1, wherein the evaluating is performed by a kernel component of the operating environment, wherein the requesting process and the destination process reside on a same computing device, and wherein the destination process receives the message directly from the message queue of the destination process.

3. The method of claim 1, wherein the request to post the message is made by a method invoked on a first window object, and wherein the destination process comprises a second window object.

4. The method of claim 1, further comprising:
evaluating a security context of the destination process to determine whether the message is to be posted.

5. The method of claim 1, further comprising:
if the message is to not be posted, notifying the requesting process that the requesting process does not have access to post the message to the destination process.

6. The method of claim 1, further comprising:
if the message is not to be posted, storing the message and the requestor information in a log.

7. The method of claim 1, wherein the additional criteria comprise at least one of, posting the message with impossible parameters, or posting the message in an inappropriate context.

8. A non-transitory machine-accessible medium comprising instructions that, when executed by a processing device, cause the processing device to perform operations comprising:
intercepting, by the processing device, a request from a requesting process to post a message to a destination process in an operating environment in which processes communicate via message queues, wherein each destination process in the operating environment communicates via a corresponding message queue;
determining whether the requesting process is a same as the destination process in view of the message;
in response to a determination that the requesting process is not the same as the destination process,
evaluating message content and requestor information associated with the request to determine whether the message is to be posted;
posting the message to a message queue of the destination process if the message is to be posted; and
if the message is not to be posted, and the message satisfies additional criteria, causing the requesting process to be terminated, wherein the additional criteria comprise
posting the message with impossible parameters; and
in response to a determination that the requesting process is the same as the destination process, posting the message to the message queue of the destination process.

9. The non-transitory machine-accessible medium of claim 8, wherein the evaluating is performed by a kernel component of the operating environment, wherein the requesting process and the destination process reside on a same computing device, and wherein the destination process receives the message directly from the message queue of the destination process.

10. The non-transitory machine-accessible medium of claim 8, wherein the request to post the message is made by a method invoked on a first window object, and wherein the destination process comprises a second window object.

11. The non-transitory machine-accessible medium of claim 8, the operations further comprising:
evaluating a security context of the destination process to determine whether the message is to be posted.

12. The non-transitory machine-accessible medium of claim 8, the operations further comprising:
if the message is to not be posted, notifying the requesting process that the requesting process does not have access to post the message to the destination.

13. The non-transitory machine-accessible medium of claim 8, the operations further comprising:
if the message is not to be posted, storing the message and the requestor information in a log.

14. The non-transitory machine-accessible medium of claim 8, wherein the additional criteria comprise at least one of posting an undocumented message, or posting the message in an inappropriate context.

15. A computing device, comprising:
a memory to store message queues;
a processing device coupled to the memory;
a message interceptor, executable by the processing device, to intercept a request from a requesting process to post a message to a destination process in an operating environment in which processes communicate via the message queues, wherein each destination process in the operating environment communicates via a corresponding message queue; and
a message evaluator, coupled with the message interceptor and executable by the processing device to:
determine whether the requesting process is a same as the destination process in view of the message;
in response to a determination that the requesting process is not the same as the destination process,
evaluate message content and requestor information associated with the request to determine whether the message is to be posted,
permit the message to be posted to a message queue of the destination process if the message is to be posted, and
if the message is not to be posted, and the message satisfies additional criteria, cause the requesting process to be terminated, wherein the additional criteria comprise posting the message in an inappropriate context; and in response to a determination that the requesting process is the same as the destination process, post the message to the message queue of the destination process.

16. The computing device of claim 15, wherein the message evaluator is a kernel component of the operating environment, and wherein the requesting process and the destination process reside on a same computing device.

17. The computing device of claim 5, further comprising:
a first window object having a method to post the message; and
a second window object that corresponds to the destination process, the second window object to receive the message and to place the message on the message queue.

18. The computing device of claim 15, wherein the message evaluator is to evaluate a security context of the destination process to determine whether the message is to be posted.

* * * * *